United States Patent

[11] 3,610,563

| [72] | Inventor | Phillip E. Allen<br>Wickliffe, Ohio |
|------|----------|-------------------------------------|
| [21] | Appl. No. | 851,547 |
| [22] | Filed | Aug. 20, 1969 |
| [45] | Patented | Oct. 5, 1971 |
| [73] | Assignee | Structural Fibers Inc.<br>Chardon, Ohio |

[54] MANDREL FOR FORMING FIBER-REINFORCED PLASTIC ARTICLES
6 Claims, 4 Drawing Figs.

[52] U.S. Cl. ............................................. 249/65,
18/45 R, 18/DIG. 19
[51] Int. Cl. ...................................................... B29c 1/00,
B29d 3/02, B28b 7/32
[50] Field of Search .......................................... 18/DIG. 19,
45 R; 249/65; 25/128 D

[56] References Cited
UNITED STATES PATENTS

| Re. 25,241 | 9/1962 | Randolph | 18/DIG. 19 |
| 1,600,353 | 9/1926 | Nose | 249/65 X |
| 1,605,782 | 11/1926 | Rota | 25/128 D |
| 2,312,587 | 3/1943 | Price | 249/65 |
| 2,485,898 | 10/1949 | Mathews et al. | 249/65 |
| 2,579,423 | 12/1951 | Ford | 249/65 |
| 2,949,658 | 8/1960 | Conn | 249/65 |
| 3,137,898 | 6/1964 | Geringer | 18/45 R |
| 3,368,239 | 2/1968 | Wiltshire | 18/DIG. 19 |

*Primary Examiner*—J. Howard Plint, Jr.
*Attorney*—McNenny, Farrington, Pearne & Gordon ABSTRACT: Hollow, reinforced plastic articles are molded in a closed molding chamber by employing an internal expandable bag to define the inside surface of the article to be molded. A nonstretchable sleeve surrounds at least a portion of the bag so that, when the bag is inflated during the molding operation, the sleeve accurately establishes the wall thickness of the article to be molded.

PATENTED OCT 5 1971 3,610,563

INVENTOR.
PHILLIP E. ALLEN
BY
McNENNY, FARRINGTON, PEARNE & GORDON
ATTORNEYS

MANDREL FOR FORMING FIBER-REINFORCED PLASTIC ARTICLES

BACKGROUND OF THE INVENTION

This invention relates to an improvement in techniques for the manufacture of hollow, fiber-reinforced articles, and more particularly it pertains to an inflatable mandrel to be used in forming the interior surface of molded hollow articles.

This invention is an improvement in the type of molding apparatus described in U.S. Pat. No. 2,977,269 to C. M. Nerwick and U.S. Pat. No. Re. 25,241 to D. W. Randolph. According to the methods described in these patents, hollow cylindrical, fiber-reinforced plastic tanks have been successfully and economically pressure molded. Generally, these methods include the steps of laying up fiber matting in a rigid mold casing in the approximate form of the desired article. A complete fiber form may include preformed matted fiber end wall caps which telescope into a laid-up, cylindrical sidewall portion.

An expandable bag or envelope which will define the interior shape of the finished article is positioned within the laid-up form in the mold. Rigid casing caps which shape the end walls of the final article are clamped to the ends of the mold casing to enclose the fiber mat form. With the fiber matting and mold thus assembled, the fiber matting is placed under a suitable moderate pressure by expanding the bag to hold it in place against the mold. The fiber matting is then permeated with a thermosetting resin or the like. The bag, besides defining the interior surface of the molded tank and determining the proper fiber-to-resin ration, compresses the fiber layup in such a manner as to avoid migration of fibers with resin flow and resulting destruction of the layup.

The use of the expandable bag to compress the fiber layup and to form the interior shape of the molded article has been very successful in the production of fiber-reinforced hollow articles. However, more rigid and precise industry standards have necessitated even more accurate control of wall thickness and fiber-to-resin ratio.

According to such prior art techniques, a rubber bag is inflated to a predetermined pressure or series of pressures. The final volume occupied by the walls of the molded article depends principally on the bulk factor of the fiber layup, its compressibility, and the ultimate bag inflation pressure. To obtain a predetermined fiber-to-resin ratio in the finished molded article, it is necessary to control the compressed thickness of the fiber layup during resin injection and during subsequent molding operations. Variations from such an ideal or optimum final wall section thickness are the result of unavoidable slight differences in fiber layup assemblies and variances in inflation pressure. To some extent, the expandable bag does not correct but, rather, complies with deviations of the fiber matting from a desired final wall configuration.

When molding cylindrical hollow articles with domed, integral end walls, it is particularly difficult to maintain uniformity in the thickness of the fiber layup over the sidewall and end walls of the article. A given inflation pressure produces interdependent forces on the sidewall and end walls. Thus it is difficult to adjust the inflation pressure to correct the force distribution on either the sidewall or end walls without affecting the other. If the expandable bag is inflated to a pressure where the end walls are sufficiently compressed, the sidewall of the article may be overcompressed. Overcompression of the sidewall may result in an unacceptably thin sidewall and/or a resin-starved sidewall and resin-rich end walls due to overcompaction of the sidewall layup and a resulting high concentration of fibers in the sidewall.

SUMMARY OF THE INVENTION

A bag or membrane is provided which, at least as to certain portions of the bag, may be inflated to a predetermined configuration and maintained at that configuration even though the inflating pressure to obtain that configuration is exceeded. The membrane is sufficiently flexible or pliable to be easily inserted into the fiber layup and extracted through an opening in the finished article.

Since at least certain portions of the membrane do not appreciably stretch, the walls of the article formed between those portions and the outer rigid mold casing will not vary in thickness when the inflation pressure increases beyond that which is necessary for proper wall thickness.

In the illustrated embodiment the portion of the membrane which will not expand beyond a predetermined configuration is determined by a cylindrical mandrel or sleeve which is slipped over and fixed to the cylindrical sidewall of an expandable envelope, such as a rubber bag. The assembled sleeve and bag are used in the production of cylindrical tanks having domed ends. The sleeve corresponds generally to the cylindrical sidewall portion of a tank. The sleeve cooperates with the cylindrical portion of the outer mold casing to accurately and repeatedly form cylindrical walls of uniform and optimum thickness. Since the sleeve is not appreciably stretched or dilated beyond a predetermined cylindrical configuration when it is subjected to an excess of inflation pressure, the thickness of the end walls of the tank may be controlled by adjusting the inflation pressure in a range above that which is necessary to suitably compress the cylindrical portions of the fiber layup.

DESCRIPTION OF THE PREFERRED EMBODIMENT

Figure 1:
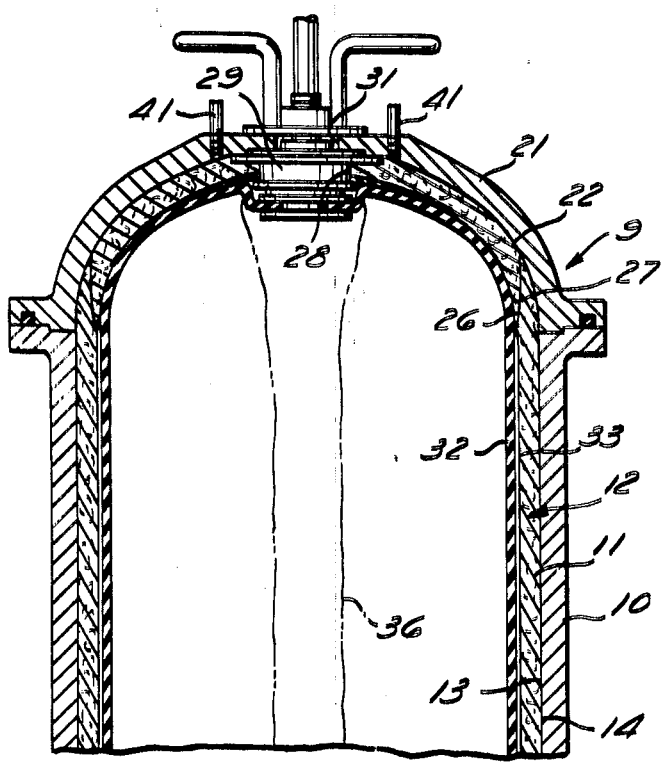
FIG. 1 is a cross-sectional view of a molding assembly having disposed therein fiber matting compressed between the outer mold casing and the inner inflatable core.
Figure 2:
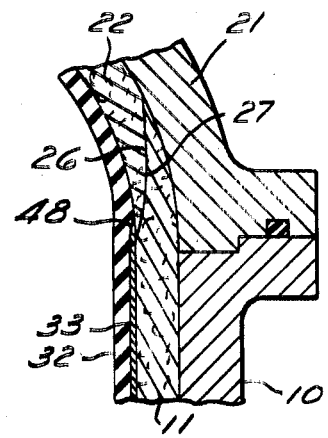
FIG. 2 is a view, on an enlarged scale, of a portion of FIG. 1 taken at an end of the cylindrical wall of the assembly.

Referring now to the figures, a molding assembly 9 includes a rigid cylindrical mold casing 10 surrounding a cylindrical sidewall portion 11 of a molded article or tank 12 of fiber-reinforced resin. The inner surface 13 of the cylindrical mold casing 10 defines the outer surface 14 of the cylindrical sidewall portion 11 of the tank 12. A rigid, domed mold casing end wall cap 18 is secured to the lower end of the cylindrical casing 10. This domed end cap 18 forms an outwardly convex bottom end wall 19 of the tank. At the upper end of the cylindrical mold casing 10 a rigid mold casing end wall cap 21, similar to the lower end cap 18, is provided to form a top end wall 22 of the fiber-reinforced tank 12.

Fiber-reinforcing material for each end wall 19 and 22 of the tank is provided in the form of cup-shaped fiber preforms whose production is familiar to those skilled in the art. A fiber preform for the bottom end wall 19 is set into the lower casing end cap 18. A felted mat of reinforcing fibers for the sidewall 11 is laid up within the cylindrical mold casing 10. Mating edges 23 and 24 of the fiber matting of the sidewall 11 and the preform for the lower end wall 19, respectively, are mutually tapered to form a smooth wall joint.

After the fiber matting of the sidewall 11 has been laid up in the cylindrical casing 10, the fiber preform of the top end wall 22 is inserted into the matting for the sidewall 11. Again, mating edges 26 and 27 of the fiber matting of the sidewall 11 and the preform for the top end wall 22, respectively, are tapered to form a uniform wall joint. The top and bottom preforms and the fiber mat sidewall form a body which approximates the form of the final article.

The fiber preform of the top end wall 22 is provided with an aperture 28 at its center or apex. Ultimately, this aperture may become a port of the finished tank. An inflation tube assembly 29 is inserted through this aperture 28 and a corresponding opening or hole 31 in the upper mold end wall cap 21. The inflation tube assembly 29 is adapted to sealingly clamp a mouth of an inflatable envelope or bag 32 of a rubber or a similar elastic material. The rubber bag 32 and a sleeve or mandrel 33 comprise an inflatable mold core. With the inflation tube assembly 29 extending through the aperture 28, the preform for the end wall 22 is positioned inside the edges 26 of the sidewall 11 and the upper cap 21 is clamped on the cylindrical casing 10 to enclose the fiber form. The rubber bag 32 and sleeve 33 in their deflated state are indicated generally by the phantom lines 36. The rubber bag 32 is inflated through the tube assembly 29 to compress the fiber matting of the end walls 19 and 22 and sidewalls 11.

The fibers reinforcing the sidewalls 11 and the end walls 19 and 22 may be loosely felted glass fibers held together with a suitable binder in a relatively compressible and porous form. After the rubber bag 32 and the sleeve 33 are inflated to hold the fiber form against the rigid mold casing 10, 18, and 21, a conventional liquid resin, settable by heat, a catalyst, or the like, is then introduced through a supply line 40. The amount of resin introduced into the mold is sufficient to permeate the entire fiber body and provide a slight excess to insure that all of the air will be driven out of the mold through a set of vents 41. The compression of the fiber body layup by the rubber bag 32 and sleeve 33 is effective in preventing migration of the individual fibers of the layup with the flow of impregnating resin.

Figure 3:
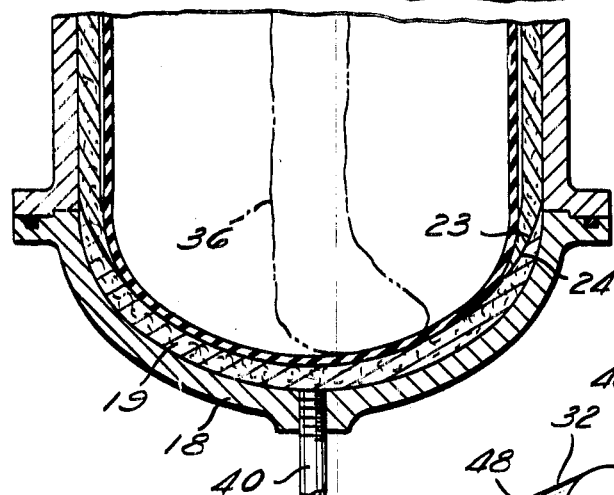
FIG. 3 is a perspective view of the sleeve or mandrel of this invention.
Figure 4:
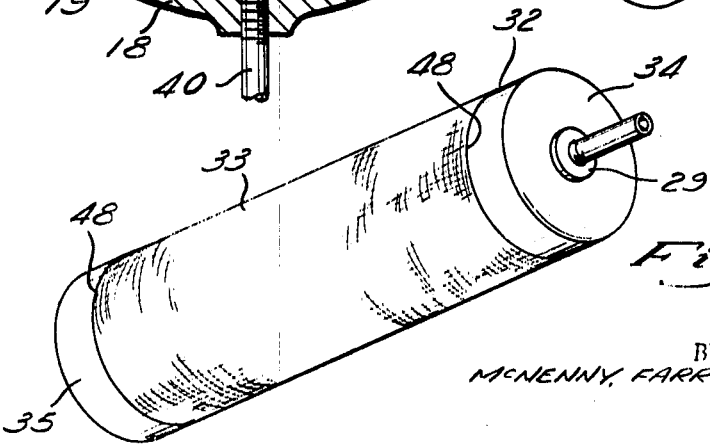
FIG. 4 is a perspective view, similar to FIG. 3, showing a bag assembly according to this invention.

As mentioned above, the inflatable mold core includes a rubber bag 32, which is of conventional construction, and a sleeve 33. The sleeve 33 is formed of a flexible but relatively nonstretchable or inelastic material, such as vulcanized neoprene coated glass cloth with a nonstretch straight weave. The flexibility of the bag 32 and sleeve 33 permits them to be extracted from the interior of a finished tank through the aperture 28. As shown in FIG. 3, the glass cloth may be fashioned from a sheet into a sleeve by overlapping a pair of its edges 46 and 47 and by joining these edges into a longitudinal seam by the application of heat, adhesive, or the like. As shown in FIG. 4, the sleeve 33 is positioned over the cylindrical portion of the rubber bag 32 and may be held in this position by taping it along its ends to the rubber bag.

The sleeve 33 is fabricated so that its outside diameter corresponds to the desired finished inside diameter of the sidewall 11 of the tank. The length of the sleeve is generally equal to the length of the tank sidewall 11. The rubber bag 32 and sleeve 33 may be encased in a protective sheath of polyvinyl acetate film or nylon film or similar material which will protect the molding resin against the chemical action of vulcanizing agents or residues thereof associated with the bag or sleeve.

The inflatable core is normally inflated with air to a final pressure of about 25-30 p.s.i. This pressure is adequate to properly compact the fiber body to form an article having a predetermined suitable fiber-to-resin ratio. Under these pressures, the nonexpandable sleeve 33 does not appreciably stretch. The tank sidewalls 11 are accurately and uniformly formed repeatedly from article to article.

In addition to providing uniform sidewall section, the nonexpandable sleeve 33 permits control of the compaction of the fiber end portions of the tank. Since the rubber bag 32 may be inflated to a pressure somewhat above the point at which the sidewalls are satisfactorily compressed without significant stretching of the sleeve 33 and overcompression of the sidewalls, an optimum force distribution on the end zones of the tank may be obtained.

As a result, the sidewalls may be produced with an optimum thickness and the end wall 19 may be likewise satisfactorily compressed to a desired thickness. In the past, when only an expandable and completely stretchable bag was used to compress the fiber body, the bag would tend to overcompress the sidewall preform and/or undercompress the end wall preforms. With the use of the nonstretchable mandrel or sleeve 33 of this invention, the rubber bag 32 may be inflated to higher pressures than could previously be used to compress the end portions 19 and 21 against the end caps 18 and 21.

The preferred embodiment utilizes a cylindrical, nonstretchable or inelastic sleeve 33 in combination with an inflatable, elastic rubber bag 32 to mold tank wall sections more uniformly than has been possible in the past. The cylindrically formed sleeve may be easily fabricated from a relatively inexpensive sheet of fabric. The dome-shaped ends 34 and 35 of the rubber bag 32, extending longitudinally beyond the ends 48 of the sleeve 33, are unhindered by the sleeve and satisfactorily compress the top and bottom preforms. If desired, the inelastic sleeve 33 and rubber bag 32 may be replaced by an inflatable core having inelastic properties in both the cylindrical and end portions.

It is to be understood that the illustrated tank embodiment has been chosen only to represent that type of application to which this invention may be advantageously applied. Obviously, other hollow article or tank configurations are well suited for applications of this invention. The scope of the invention is not limited to the slavish imitation of all the details mentioned above. These have merely been given by way of an example of a presently preferred embodiment of the invention.

What is claimed is:

1. An apparatus for molding elongated hollow fiber reinforced tanklike articles comprising a closed rigid mold casing assembly defining the exterior of a molded article, the mold casing assembly including elongated, longitudinally extending circumferentially continuous sidewall portions and associated end wall portions, one of said wall portions including an opening therethrough, a flexible inflatable mold core adapted to be positioned within said mold casing to compress prepositioned reinforcing fibers of an article against said wall portions upon inflation thereof, said core providing a mouth portion adapted to receive pressurized fluid through said opening for its inflation, said core having an inflated configuration corresponding to the desired general shape of the articles to be formed and generally following the configuration corresponding to the desired general shape of the articles to be formed and generally following the configuration of said sidewall and end wall portions, said mold core comprising at least two portions, a first of said core portions being associated with said longitudinal sidewall portions and a second of said core portions being associated with said end wall portions, said second one of said core portions being substantially more elastic than said first core portions, said second one of said core portions being adapted to expand to suitably compress adjacent reinforcing fibers in response to inflation pressure adjustments and said first relatively inelastic core portion being adapted to maintain a constant configuration without appreciable expansion during such pressure adjustments.

2. An apparatus as set forth in claim 1, wherein said sidewall portions define a cylindrical wall and said end wall portions form outwardly curved domed surfaces at opposite ends of said cylindrical wall 3. In combination with a molding apparatus for forming hollow fiber-reinforced articles by fluid pressure including a closed rigid mold casing defining the exterior of a molded article having cylindrical sidewalls and integral end walls with an aperture through one of said walls, said mold casing including a wall portion having an opening therethrough to be aligned with said aperture, and a flexible inflatable expandable envelope adapted to be positioned within said mold casing to compress reinforcing fibers of an article against said mold casing, said envelope providing a mouth portion adapted to receive pressurized fluid through said opening and aperture, the improvement which comprises a flexible nonstretchable sleeve means positioned over said expandable envelope, said sleeve means having an inflated configuration which determines the desired interior configuration of the cylindrical sidewalls of the finished article and prevents expansion of said envelope at said sidewalls beyond said desired configuration while permitting unrestricted movement of said envelope at said end walls.

4. An improvement in molding apparatus as set forth in claim 3, wherein said sleeve means is formed of a straight-weave nonstretchable fabric.

5. An improvement in molding apparatus as set forth in claim 3, wherein said sleeve is a cylinder constructed from a sheet and has a longitudinal seam formed by the edges of said sheet.

6. An improvement in molding apparatus as set forth in claim 3, wherein said end walls are outwardly convex.